United States Patent [19]

Föhl

[11] 4,372,012
[45] Feb. 8, 1983

[54] BELT ADJUSTING DEVICE FOR A SAFETY BELT

[75] Inventor: Artur Föhl, Schorndorf-Haubersbronn, Fed. Rep. of Germany

[73] Assignee: REPA Feinstanzwerk GmbH, Alfdorf, Fed. Rep. of Germany

[21] Appl. No.: 121,475

[22] Filed: Feb. 14, 1980

[30] Foreign Application Priority Data

Feb. 15, 1979 [DE] Fed. Rep. of Germany ....... 2905832

[51] Int. Cl.³ .............................................. A44B 19/00
[52] U.S. Cl. ................... 24/68 R; 24/68 SB; 24/194; 24/230 AL; 297/483
[58] Field of Search ............. 24/68 R, 68 SB, 68 CD, 24/132 R, 132 AA, 136 K, 194, 230 AK, 230 AL, 170; 297/468, 483

[56] References Cited

U.S. PATENT DOCUMENTS

| 896,644 | 8/1908 | Kunzler | 24/194 |
|---|---|---|---|
| 1,049,732 | 1/1913 | Kerngood | 24/194 |
| 2,020,531 | 11/1935 | White | 24/194 |
| 2,478,994 | 8/1949 | White | 24/132 R |
| 2,492,559 | 12/1949 | Dixon | 24/194 |
| 3,311,412 | 3/1967 | Kelly | 297/468 |
| 3,486,793 | 12/1969 | Cederberg et al. | 297/483 |
| 3,695,697 | 10/1972 | Stoffel | 297/483 |
| 4,102,020 | 7/1978 | Lindblad | 297/483 |

FOREIGN PATENT DOCUMENTS

| 2250945 | 8/1973 | Fed. Rep. of Germany | 297/483 |
|---|---|---|---|
| 5240 | of 1897 | United Kingdom | 24/132 R |
| 738989 | 10/1955 | United Kingdom | 24/230 AL |

Primary Examiner—Victor N. Sakran
Attorney, Agent, or Firm—Herbert L. Lerner; Laurence A. Greenberg

[57] ABSTRACT

Belt adjusting device for a safety belt, including a sliding member having a slot formed therein bordered by edges of the sliding member through which a portion of the safety belt is pulled forming a loop, and a locking bar at least partly disposed within the belt loop, the locking bar being slideable transversely to the slot and having a groove formed therein extending parallel to the slot, when a load is applied to the belt the groove formed in the locking bar is aligned opposite one of the edges of sliding member bordering the slot, and the belt is pressed between the groove formed in the locking bar and the one edge of the sliding member.

13 Claims, 8 Drawing Figures

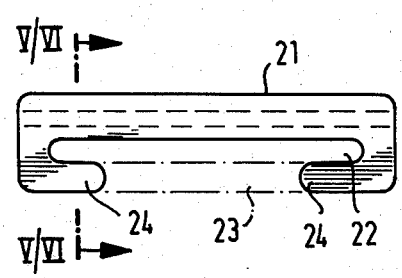
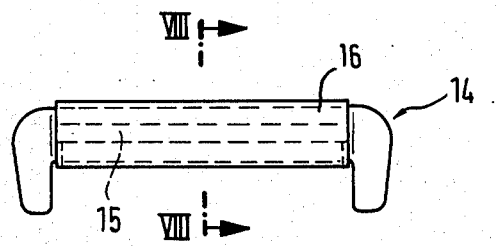
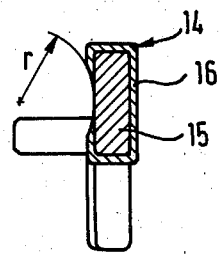

BELT ADJUSTING DEVICE FOR A SAFETY BELT

The invention relates to a belt adjusting device for a safety belt with a sliding member, having a pull-through slot through which the end of the belt is pulled, looping around a locking-bar which is slideable transversely to the slot, so that the belt end is clamped between a rounded edge of the slot, and the locking bar.

In a known belt adjusting device for a belt of the hereinafore described construction, the locking-bar which is essentially a U-shaped stamped part, has two legs which are bent at the sides thereof, by way of which the locking bar can brace itself on the sliding member at the sides of the pull-through slot. The part of the locking-bar which is between the legs (or side pieces) has a rectangular profile and is partly covered by a sheetmetal sheath. The sheath has sharp edges on one side thereof that are opposite the rounded edge of the pull-through slot, and other sharp edges which end on the surface of the bar where the other edge of the sheetmetal sheath is located. The free end of the belt is pulled through the slot in the form of a loop, and is slung around the locking-bar, whereby a part of the free belt end is positioned between the hereinafore mentioned edge of the locking-bar and the edge of the slot of the sliding member. The sliding member can be constructed, for example, as part of a belt lock and be closed by a belt lock which is secured to the center rail or tunnel of the vehicle. Due to the movability of the locking-bar, the edge of the locking-bar can be moved away from the edge of the slot, thereby making the longitudinal adjustment of the belt possible. Meanwhile, when the belt is loaded, i.e. in case of a crash, for example, the captive part of the belt presses the locking-bar and the free belt end against the edge of the slot of the slideable member. In this way the belt is clamped between the sharp edge and the edge of the slot, thereby securing the safety belt. The edge of the slot may be rounded, for example, during the stamping process. It has become known that in practical use the danger exists, in case of a crash and when the belt is dynamically loaded, that the belt will be cut through, as though with a knife, at the hereinafore-mentioned limiting edge of the clamping point, and/or at the edge of the sheetmetal sheath which is closely in line with the front surface of the locking-bar. On the other hand, it is absolutely necessary to make the limiting edge of the sheetmetal sheath as a sharp edge, because otherwise a sufficient clamping action cannot be achieved.

It is accordingly an object of the invention to provide a belt adjusting device for a safety belt which overcomes the hereinaforementioned shortcomings of the heretofore known devices of this general type, so that a sufficient clamping effect is achieved using a simple construction, while on the other hand damage to the belt is reliably avoided.

With the foregoing and other objects in view there is provided, in accordance with the invention, a belt adjusting device for a safety belt, comprising a sliding member having a slot formed therein bordered by edges of the sliding member through which a portion of the safety belt is pulled forming a loop, and a locking-bar at least partly disposed within the belt loop, the locking-bar being slideably transversely to the slot and having a groove formed therein extending parallel to the slot, when a load is applied to the belt the groove formed in the locking-bar is aligned opposite one of the edges of sliding member bordering the slot, and the belt is pressed between the groove formed in the locking-bar and the one edge of the sliding member. This has the effect that the belt is deflected in the region where clamping takes place corresponding to the depth of the groove, so that a better clamping action is effected, and a sharp-edged clamping element, as used in the known technique, is completely avoided. In contrast, the limiting edges of the groove, as well as the edges of the locking-bar in the region where the belt is slung around it, can be rounded, so that no shearing or cutting forces act on the belt when the belt is under load.

In accordance with another feature of the invention, the locking-bar includes a sheathing partly surrounding the locking-bar in a given direction; the sheathing having parallel end-edges being spaced apart from each other forming the width of the groove.

In accordance with a further feature of the invention, the groove is semi-circular and is machined into the locking-bar.

In accordance with an added feature of the invention, the bordering edges of the slot formed in the sliding member and edges of the locking bar coming in contact with the belt loop, are rounded off.

In accordance with an additional feature of the invention, the end-edges are cut along a given radius of a circular milling cut. This achieves the result that a groove is formed by the sheathing, and simultanuously the deflection edges of the locking-bar are rounded corresponding to the bending-radius of the sheath, so that further working operations are not required.

In accordance with yet another feature of the invention, the locking-bar has a narrow belt guiding slot formed therein.

In accordance with yet an additional feature of the invention, the locking-bar includes two belt guiding lobes extending toward each other from opposite ends of the locking-bar, with a space therebetween in the shape of a T. In this manner the locking-bar cannot leave the belt at the side thereof, particularly when the load is quickly applied.

In accordance with a concomitant feature of the invention, there is provided a U-shaped sheetmetal sheathing having rounded corners, the sheathing being disposed on the sliding member, extending through the slot formed therein, and covering the one edge of the sliding member. This feature has proven to be particularly advantageous, because it is difficult and costly to round-off the slot of the sliding member, which is preferably made as a stamping, during the stamping operation, for example, while the U-shaped sheath by itself has sufficiently rounded bending radii.

By the use of sheathings over the locking-bar and over the sliding member, the possibility exists of manufacturing the locking-bar and the sliding member as completely stamped-out parts, without costly secondary working operations, and at the same time to achieve excellent clamping action without detrimental shearing effects on the belt.

Other features which are considered as characteristic for the invention are set forth in the appended claims.

Although the invention is illustrated and described herein as embodied in a belt adjusting device for a safety belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
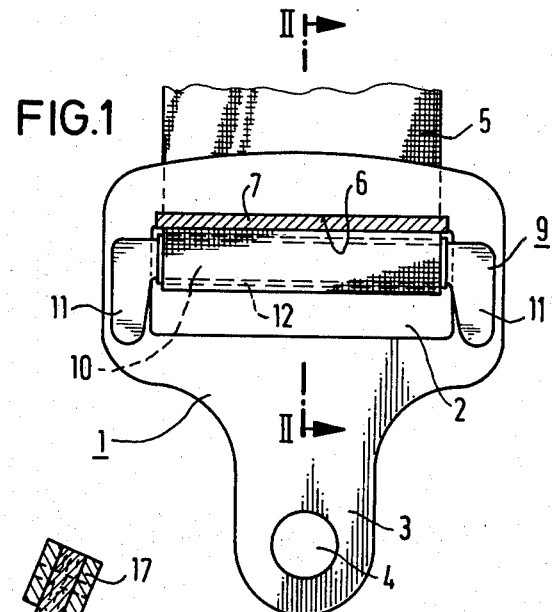
FIG. 1 is a diagrammatic front-elevational view of the belt adjusting device according to the invention, together with a part of the belt.
Figure 2:
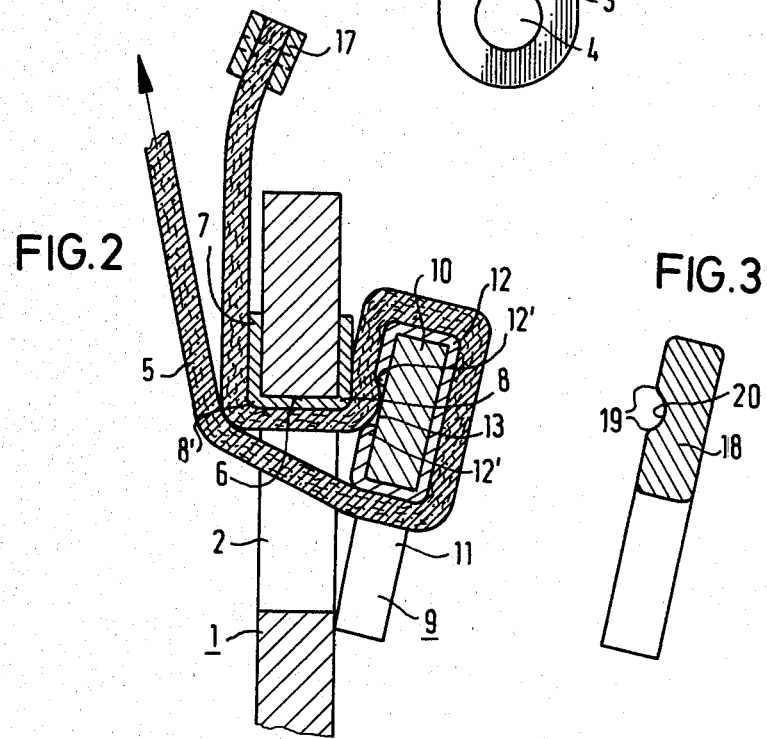
FIG. 2 is an enlarged fragmentary cross-sectional view of the belt adjusting device of FIG. 1 taken along the line II—II thereof, in the direction of the arrows.

FIGS. 4, 5 and 6 are further diagrammatic alternate embodiments of the locking-bar, FIG. 4 being a front elevational view and FIGS. 5 and 6 being cross-sectional views taken along the lines V/VI—V/VI in FIG. 4 in the direction of the arrows, but differing in accordance with a feature which is not visible in FIG. 4; and FIGS. 7 and 8 are views similar to FIGS. 4, 5 and 6, showing the locking-bar of the belt adjusting device which has a slightly different configuration from that shown in FIGS. 1 and 2, FIG. 7 being a front-elevational view and FIG. 8 being a cross-sectional view taken along the lines VIII—VIII in FIG. 7, in the direction of the arrows.

Referring now to the figures of the drawing and first particularly to the embodiment according to FIGS. 1 and 2, there is seen a chain link-like-shaped slide fitting which is designated with reference numeral 1, and is made in the form of a flat stamped part, having a long, rectangular, draw-through or passage slot 2, and a narrowed plug-in tongue 3 having an opening 4 formed therein. The slide fitting 1 is fastened in a known manner to the end of a belt 5, which itself can be fastened to the frame of a vehicle, for example. The slide fitting 1 can be inserted with the tongue 3 into a non-illustrated belt lock of the safety belt, which can be secured, for example, at the center tunnel of the vehicle. Naturally, instead of the tongue 3, an additional belt can be attached at this side of the slide fitting as a load element, so that the heretofore-described belt adjusting device is used as an intermediate, separate construction part in the safety belt system. In FIGS. 1 and 2, there is seen a U-shaped sheathing 7 made of sheet metal and having rounded slot edges 8 and 8' in the region of the slot-edge 6 of member 1, which are formed by the bend radii of the U-shaped sheetmetal part. The sheathing 7 is form-lockingly and force-lockingly pushed onto the upper slot edge 6. A U-shaped locking-bar which is designated with reference numeral 9 and is also made as a stamped part, has short legs 11 on both sides of a straight, rectangular bar portion 10, by means of which the locking-bar 9 extends beyond the pull-through or passage slot 2 above and below the edges thereof. The above-mentioned portion 10 of the bar is provided with a sheathing 12 made of sheetmetal and having rounded corners formed by the bending radii, as shown in FIG. 2. The end-edges 12' of the sheathing 12 are spaced from each other on the front surface of the bar 9 toward the near side of the support or slot edge 8, and form a groove 13, the depth of which corresponds to the thickness of the material of the sheathing 12. As FIG. 2 clearly shows, these end-edges 12' run parallel to the edge of the slot 8, and are rounded. In the embodiment according to FIGS. 7 and 8, a slightly varied form of a locking-bar 14 is shown, having a middle portion 15 which is also covered by a sheathing 16. In this embodiment the end-edges of the sheathing 16 are broken and flattened according to a radius r by means of a circular grinding or milling cut.

The free end of the belt 5 is provided with a termination bar 17, that is pulled through the slot 2 in the form of a loop, and winds around the sheathed locking-bar 9. In this way, the belt portion becomes loaded in case of a crash for example, as indicated by an arrow in FIG. 2. In the embodiment of FIGS. 1 and 2 the locking-bar 9 can be moved downward, so that the effective belt length can be easily adjusted by pulling up the unloaded end of the belt, or the loaded portion of the belt. When the belt 5 is loaded, i.e. when pulling forces are acting in the direction of the arrow in FIG. 2, the locking-bar 9 is pressed upward beyond the edge 8 of the slot. Simultaneously the edge 8 presses the belt into the groove 13 of the locking-bar 9, and thereby deforms the belt. By this additional deflection of the belt 5 an increased clamping effect is achieved, so that no slippage of the belt 5 can occur. Thereby no shearing or cutting effects are transmitted to the fabric belt 5, because all deflection and contact edges are rounded.

Figure 3:
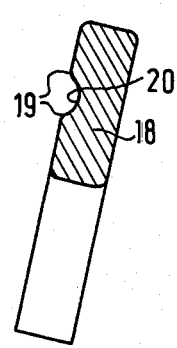
FIG. 3 is a diagrammatic sectional view of another embodiment of the locking-bar of the belt adjusting device according to the invention.

In the embodiment according to FIG. 3, the locking-bar 18 is not covered by a sheath. Rather a groove 20 is formed or machined in the rectangular bar, and is also provided with rounded edges 19.

In another embodiment of the locking-bar according to FIGS. 4 to 6, the locking bar 21 and 21' has a band-guide in the form of an extended, narrow guide-slot 22 with a connecting or boundary bar 23, shown in dotted lines, or with lobes 24 which enclose the edges of the belt. In this manner a connection between the belt and the locking-bar is established so that the belt cannot slip away. FIG. 5 shows the construction for use with sheet-metal sheathing as in FIGS. 2 and 8, while the construction according to FIG. 6 can be compared with the construction of FIG. 3 without sheathing.

The embodiments of the invention in which an exclusive property or privilege is claimed are defined as follows:

1. Belt adjusting device for a safety belt, comprising a sliding member having a slot formed therein bordered by edges of said sliding member through which a portion of the safety belt is pulled forming a loop, and a locking-bar at least partly disposed within the belt loop, said locking-bar being slideable transversely to said slot and having a surface with a blind groove formed therein extending parallel to said slot, when a load is applied to the belt, said groove formed in said locking-bar is aligned opposite one of said edges of sliding member bordering said slot, and the belt is pressed between said groove formed in said locking-bar and said one edge of said sliding member.

2. Belt adjusting device for a safety belt, comprising a sliding member having a slot formed therein bordered by edges of said sliding member through which a portion of the safety belt is pulled forming a loop, and a locking-bar at least partly disposed within the belt loop, said locking-bar being slideable transversely to said slot and having a groove formed therein extending parallel to said slot, when a load is applied to the belt, said groove formed in said locking-bar is aligned opposite one of said edges of sliding member bordering said slot, and the belt is pressed between said groove formed in said locking-bar and said one edge of said sliding member, said locking-bar including a sheathing partly surrounding said locking bar in a given direction, said sheathing having parallel end edges being spaced apart from each other forming the width of said groove.

3. Belt adjusting device according to claim 1, wherein said groove is semi-circular and is machined into said locking bar.

4. Belt adjusting device according to claim 1, wherein said bordering edges of said slot formed in said sliding member and edges of said locking bar coming in contact with the belt loop, are rounded.

5. Belt adjusting device according to claims 2 or 3, wherein said bordering edges of said slot formed in said sliding member and edges of said locking bar coming in contact with the belt loop, are rounded.

6. Belt adjusting device according to claims 2 or 4, wherein said end edges are cut along a given radius of a circular milling cut.

7. Belt adjusting device according to claim 1, wherein said locking-bar has a narrow belt guiding slot formed therein.

8. Belt adjusting device according to claim 1, wherein said locking-bar includes two belt guiding lobes extending toward each other from opposite ends of said locking-bar.

9. Belt adjusting device according to claim 1, including a U-shaped sheetmetal sheathing having rounded corners, said sheathing being disposed on said sliding member, extending through said slot formed therein, and covering said one edge of said sliding member.

10. Belt adjusting device according to claim 1 wherein said surface of said locking-bar is disposed obliquely to said sliding member and is pressed against said one edge of said sliding member when the load is applied to the belt.

11. Belt adjusting device according to claim 1, wherein the belt is pulled in a given direction when the load is applied and said locking-bar is pulled in said given direction when the load is applied.

12. Belt adjusting device according to claim 10 or 11, wherein the belt has a first portion disposed in said slot and a second portion adjacent said first portion at said groove, said portions forming an angle of greater than 90° when the load is applied.

13. Belt adjusting device according to claim 1, when said surface of said locking-bar is substantially planar and said groove is formed substantially in the middle of said surface.

* * * * *